United States Patent
DeGrandpre et al.

(10) Patent No.: US 6,985,503 B1
(45) Date of Patent: Jan. 10, 2006

(54) INVERSE MULTIPLEXER

(75) Inventors: Marcel DeGrandpre, Kanata (CA); Alexandre Pires, Kanata (CA)

(73) Assignee: Zarlink Semiconductor Inc., Kanata (CA)

(*) Notice: Subject to any disclaimer, the term of this patent is extended or adjusted under 35 U.S.C. 154(b) by 900 days.

(21) Appl. No.: 09/634,706

(22) Filed: Aug. 7, 2000

Related U.S. Application Data

(60) Provisional application No. 60/152,281, filed on Sep. 3, 1999.

(30) Foreign Application Priority Data

Aug. 9, 1999 (GB) .................................. 9918734

(51) Int. Cl.
H04J 3/04 (2006.01)

(52) U.S. Cl. ...................................... 370/536; 370/413

(58) Field of Classification Search ................ 370/535, 370/536, 542, 544, 537, 543, 907, 916, 540, 370/396, 394, 389, 392, 397, 395.1, 395.4, 370/395.41, 395.5, 395.51, 400, 404, 406, 370/437, 442, 443, 449, 452, 460, 462, 463, 370/386, 387, 388, 413

See application file for complete search history.

(56) References Cited

U.S. PATENT DOCUMENTS

| 5,262,906 | A | * | 11/1993 | Mazzola | 370/255 |
|---|---|---|---|---|---|
| 5,282,200 | A | * | 1/1994 | Dempsey et al. | 370/245 |
| 5,608,733 | A | * | 3/1997 | Vallee et al. | 370/394 |
| 6,385,165 | B1 | * | 5/2002 | Kumata | 370/216 |
| 6,452,945 | B1 | * | 9/2002 | Upham et al. | 370/480 |
| 6,553,027 | B1 | * | 4/2003 | Lam et al. | 370/386 |
| 6,553,029 | B1 | * | 4/2003 | Alexander | 370/389 |
| 6,621,794 | B1 | * | 9/2003 | Heikkinen et al. | 370/235 |

FOREIGN PATENT DOCUMENTS

| EP | 0818941 | 1/1998 |
|---|---|---|
| GB | 2310971 | 9/1997 |
| WO | WO 93 02514 A | 2/1993 |
| WO | 93/13609 | 7/1993 |
| WO | 96/08120 | 3/1996 |
| WO | WO 96 08120 A | 4/1996 |
| WO | 96/17489 | 6/1996 |
| WO | 97/33398 | 9/1997 |
| WO | 98/08355 | 2/1998 |
| WO | 99/04521 | 1/1999 |

* cited by examiner

Primary Examiner—Huy D. Vu
Assistant Examiner—Daniel Ryman
(74) Attorney, Agent, or Firm—Marks & Clerk; Richard J. Mitchell

(57) ABSTRACT

An inverse multiplexer device has an input port for receiving a stream of data packets, a plurality of output ports for connection to outgoing physical links, and transmit buffers for preparing outgoing packets. An expansion port can receive packets from the transmit buffers and transfer them through a corresponding expansion port on another like inverse multiplexer to designated output links on the other inverse multiplexer. A controller outputs the data packets on a group of any of the aid links in accordance with an inverse multiplex protocol. The multiplexers can be thus cascaded to increase the number of output links that can be accommodated.

14 Claims, 4 Drawing Sheets

INVERSE MULTIPLEXER

This application claims the benefit of provisional application No. 60/152,281 filed Sep. 3, 1999.

FIELD OF THE INVENTION

This invention relates to the field of packet transmission, and in particular to an inverse multiplexer for sending a stream of cells or packets onto a plurality of transmission links. The invention is particularly applicable to asynchronous transfer mode (ATM) transmission.

BACKGROUND OF THE INVENTION

In ATM technology, a stream of cells must be transmitted over a physical link to a receiver, where the cell stream is demultiplexed into a series of virtual channels. If only one link is used, for example, a DS1 link, the transmission rate is obviously limited by the physical bandwidth of the link. The ATM Forum has defined a standard, known as IMUX, inverse multiplexing, whereby a cell stream can be divided among several links so that the total bandwidth to the cell stream is the aggregate bandwidth of the links. In accordance with a defined protocol, the cells are transmitted in a round robin fashion over the several links and assembled into a single cell stream at the far end.

The device for performing this operation is an Imux transceiver. It may conveniently be incorporated on a single chip. The Imux transmitter takes a stream of cells, and transmits them over a series of physical links, typically E1 or T1 access lines, and to a receiver which generates a corresponding stream of cells at the far end.

Typically an Imux will have sixteen output ports capable of accommodating a corresponding number of links. Increasing the number of ports results in an increase in the complexity of the chip, which is not justified in all situations. It is desirable to have a standardized chip rather than customize the chip for different markets.

For example, a DS3 link includes 28 T1 links multiplexed together. In order to send cells over a DS3 link, they must first be divided among the 28 T1 channels, but it does not necessarily follow that the IMA group will be chosen from the first sixteen links. A conventional sixteen port Imux cannot accommodate the remaining twelve links, yet a device with 28 ports has greatly increased complexity and also has a more limited market.

An object of the invention is to alleviate these problems.

SUMMARY OF THE INVENTION

According to the present invention there is provided an inverse multiplexer device comprising an input port for receiving a stream of data packets, a plurality of output ports for connection to outgoing physical links, a transmit buffers for preparing outgoing packets, an expansion port capable of receiving packets from said buffers and transferring them through a corresponding expansion port for transfer to said output ports, a first expansion port capable of receiving packets from said transmit buffers and transferring them through a corresponding second expansion port on an other like inverse multiplexer device to designated outgoing physical links on said other inverse multiplexer device; and a controller for transferring the data packets in a round-robin fashion from said transmit buffers through said output ports or said expansion port to a group of outgoing physical links made up of links associated with both said inverse multiplexer device and said other inverse multiplexer device and forming an inverse multiplex group in accordance with an inverse multiplex protocol whereby said inverse multiplexer devices can be cascaded to increase the number of output links that can be accommodated by said inverse multiplex protocol.

The packets are typically ATM cells, although the invention would be applicable to other network protocols. Another application of the invention is the use of IMA over SHDSL and HDSL2 lines. These lines are gradually replacing T1 and E1 lines.

Typically, a transmitter and complementary receiver are integrated on the same chip to provide a bi-directional device.

The expansion ports are preferably connected in the form of a ring carrying time division multiplexed data between two or more IMA devices connected together in a daisy chain arrangement. The ring has a plurality of parallel lines, as well as some control lines, since desirably the expansion port connects to the output buffers where the data flows are parallel.

A switch is preferably provided to disconnect the output port normally associated with an transmit buffer when packets output from that buffer are to be sent out on an IMA link connected to the other inverse multiplexer device.

It will thus be seem that it is possible to configure an IMA group using the expansion port from another similar device.

An important advantage of this device arises when it terminates one or more DS3 links. The DS1 links that are demultiplexed from the DS3 link can be physically connected to different IMA-devices. Through the use of the expansion port, any DS1 (from any IMA device, up to 6 devices) can be a member of an IMA group on any of the IMA-16 devices. This is done without any limitation on the current IMA implementation. The full IMA specification is still supported with CTC and ITC clocking mode. Without the expansion port, an external TDM switch terminating 28 or more DS1 links would be required with a limitation on the timing mode. Only the CTC mode could be used. Furthermore, no grooming at the DS1 level is required as the device permits connection of any DS1 link to any IMA group and no external circuitry is required.

The limit to the number of devices connected in the daisy chained ring is normally six, and the number of outside connections that can be addressed is limited to a total of 32. A DS1 link that is connected to an on-chip IMA group does not consume any of the 32 addresses on the ring, as it does not have to pass the ring as it is passed directly from the transmit buffer to the output port.

BRIEF SUMMARY OF THE DRAWINGS

The invention will now be described in more detail, by way of example only, with reference to the accompanying drawings, in which:—

DESCRIPTION OF THE PREFERRED EMBODIMENTS

Figure 1:
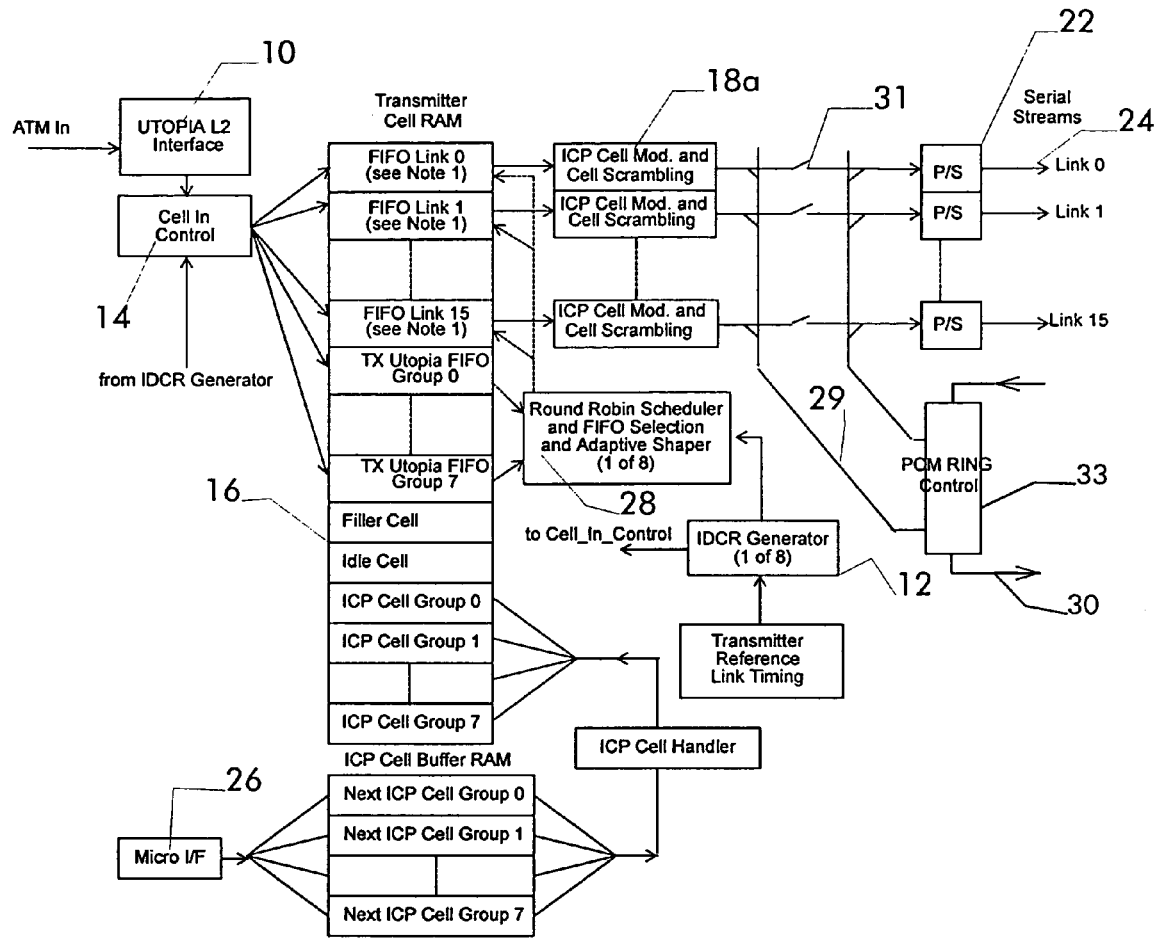
FIG. 1 is a functional block diagram of a transmitter in IMA mode.

Referring now to FIG. 1, the IMA transmitter, which is also capable of operating in the UNI mode, i.e. with one cell stream being assigned to a single link, comprises a Utopia level 2 interface 10 for receiving an ATM cell stream from an ATM layer device, such as an ATM switch (not shown). The transmitter is normally integrated on single chip with the receiver shown in FIG. 2.

An IMA (Inverse Multiplexer for ATM) Data Cell Rate Generator 12 controls the flow of cells through cell control block 14 into FIFO transmit buffers 16 connected through ICP cell modifiers and cell scrambling blocks 18, and parallel connections 20 to parallel to serial converters 22 providing output ports for connection to respective links 24. The FIFO transmit buffers 16 serve as the TX UTOPIA FIFO when the link is configured in the UNI mode (i.e. without the inverse multipexing feature enabled) and the TX link FIFO when the device is configured in the IMA mode.

The device is under overall control of a microprocessor through interface 26. Controller 28 provides the round robin scheduler and FIFO selection and adaptive shaper to inverse multiplex the outgoing cell through blocks 18 and connections 20 onto outgoing links 24 after parallel to serial conversion in blocks 22.

In the UNI mode, i.e. without inverse multiplexing active, incoming cells are passed to link FIFOs 16 (link 0 to link 15) and out through the associated units 18 connected directly to the respective output ports 22.

In the IMA mode, the incoming cells are first passed to the group FIFOs 16 (group 0 to group 7), from where there are placed in the link FIFOs (link 0 to link 15) by the round robin scheduler 28 for transmission over the links forming the IMA groups. The device described so far operates in a conventional manner in accordance with the ATM forum specifications except that the link FIFOs can now be associated with physical links present on a different device.

In accordance with the principles of the invention, the outputs of blocks 18 can be diverted through parallel connections 29 and ring 30 to links associated with a separate but similar device cascaded with the present device. The ring 30 consists of eight lines carrying parallel data as well as some additional control lines carrying control signals between different devices. It thus acts as an interface to interconnect two or more similar devices and allow links connected to another device to form part of an IMA group with physical links on the first device. Each device has a ring control expansion port 33 connected in a daisy chain arrangement.

Switches 31 break the connection between the ports 22 and the blocks 18 when the cells are to be diverted to a link attached to another device through the ring 30. Thus, for example, a cell leaving the first Unit 18a would be diverted from link 0 to the selected link in the cascaded device connected to the ring 30 through expansion port 33.

Figure 2:
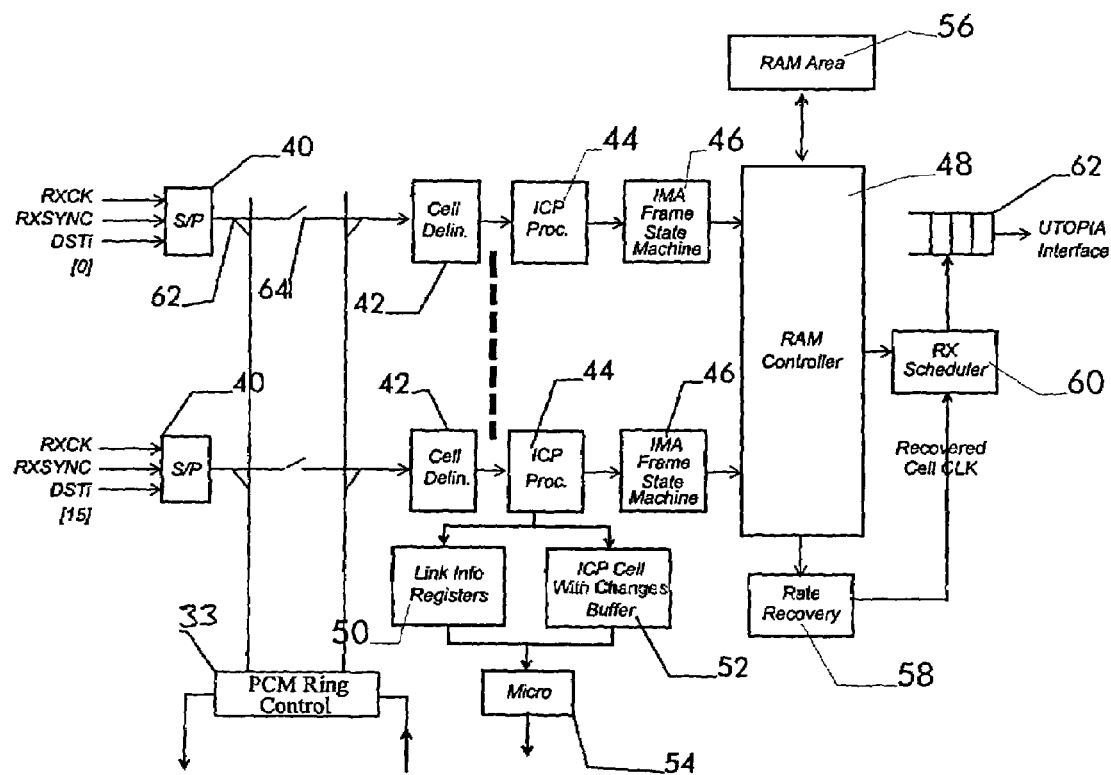
FIG. 2 is a block diagram of a receiver in IMA mode.

The receive circuitry is shown in FIG. 2. Incoming DS1 links are connected to serial-to-parallel converters 40, cell delineation blocks 42, ICP processing blocks 44, IMA frame state machines 46 and RAM controller 48. The ICP cell processing blocks are connected to link info registers 50 and a buffer 52 storing ICP cells with changes. These are connected through microprocessor interface 54 to the controlling microprocessor (not shown).

The RAM controller 48 is connected to RAM 56, rate recovery block 58, RX scheduler 60 and UTOPIA interface 62. This interface outputs a stream of ATM cells corresponding to the input stream.

The operation of the receive circuitry described so far is conventional for an IMA receiver. In a similar manner to the transmitter, the links 62 between the serial-to-parallel converters 40 and their corresponding cell delineation blocks 42 can be broken by switches 64, which permit incoming cells to be routed into a similar cascaded device through the common ring 30. For example, the top link $DST_{[0]}$ could form part of an IMA group with links from a similar cascaded device (not shown). Alternatively, cells arriving on a link, say $DST_{[3]}$ of a similar device could be routed through the ring 30 to the cell delineation block 42 for link $DST_{[0]}$ in the place of cells normally arriving on this link.

It will thus be seen how the device can be cascaded with other like devices through the ring to allow IMA groups to be formed of links connected to different devices. This increases the total number of links N from which a particular IMA group consisting of n links can be formed, where $n \leq N$, without the need for producing a custom device or significantly increasing the pin count. For example, any selection of 28 DS1 links forming a DS3 trunk can be made to form an IMA group by cascading two devices together through the ring as described without the need for any external circuitry or switch.

Figure 4:
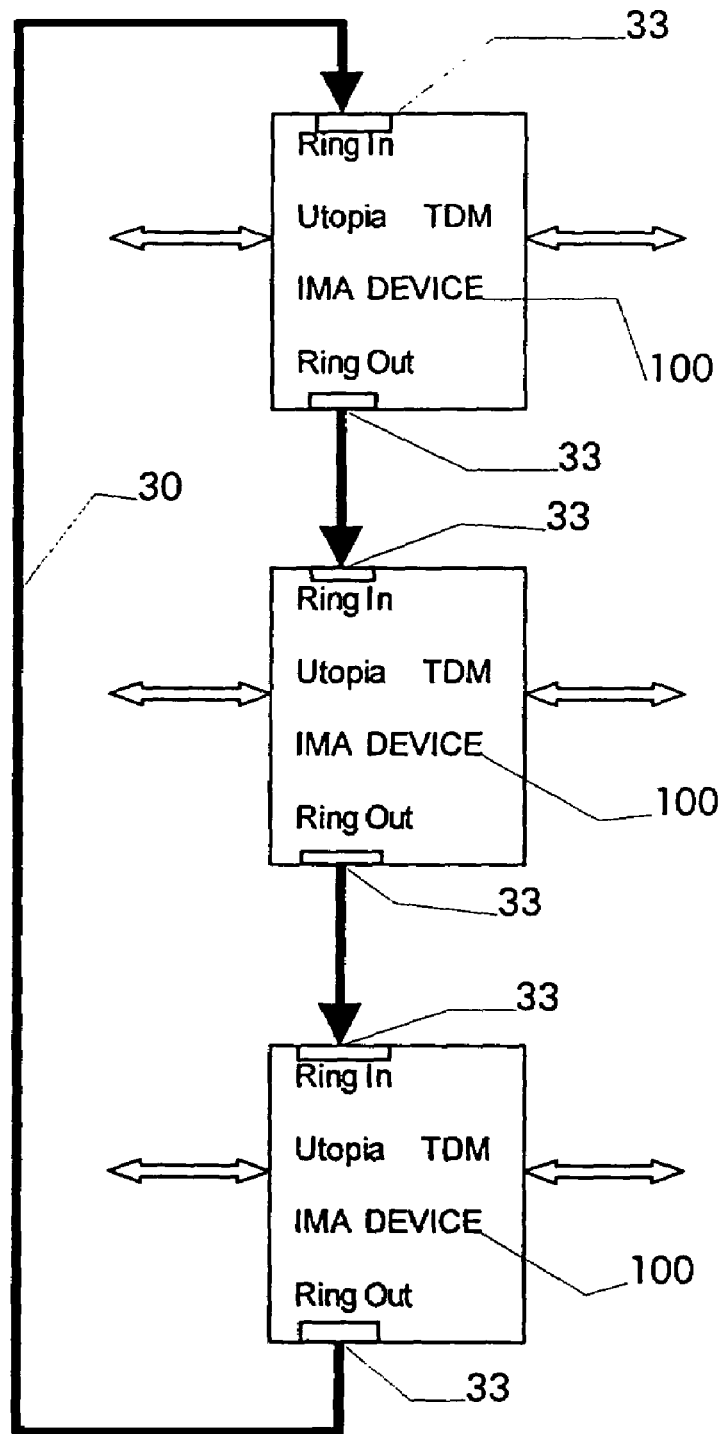
FIG. 4 shows a series of devices connected together through their expansion ports.

FIG. 4 shows three IMA devices 100 connected together in ring 30 by means of their respective expansion ports 33. Each expansion port has a transmit and receive side for respectively transmitting data on and receiving data from the ring 30.

Figure 5:
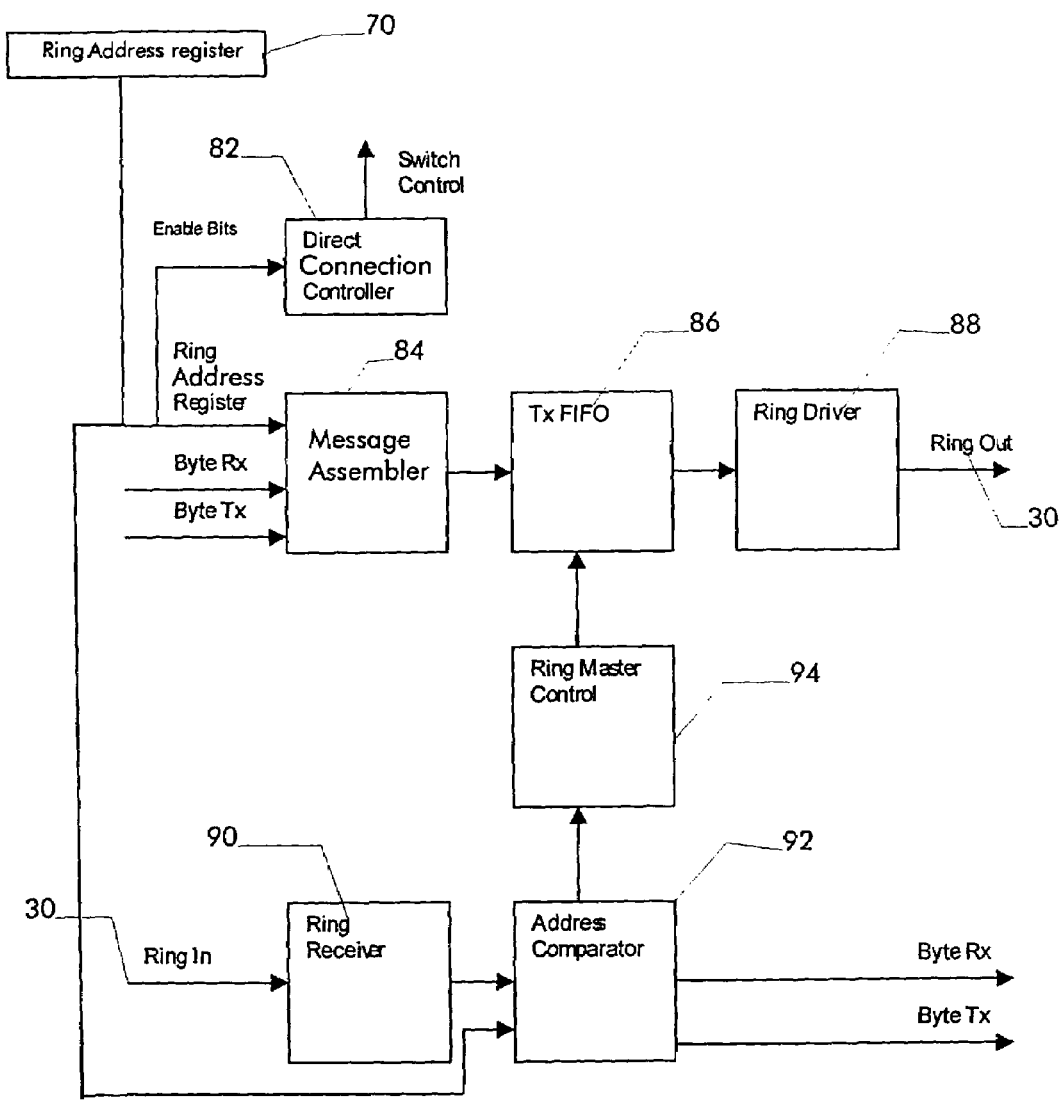
FIG. 5 is a block diagram of a ring controller.

FIG. 5 shows the expansion port 33 in more detail. A ring address register 70, shown in more detail in FIG. 3, associated with each ICP cell modifier block 18 stores the address of the outgoing physical link. If this is the link 24 connected directly to the ICP modifier block 18, enable bits are set and cause direct connection controller 82 to close switch 31 in order to pass the output byte directly to the associated physical link. If the address corresponds to a link on another device, switch 31 is opened and the Tx byte is assembled into a message in message assembler 84 for transmission over the ring 30. The message is first passed into Tx FIFO 86 and then ring driver 88, which physically places the message on the ring 30.

Byte Rx input to message assembler 84 comes from a serial-to-parallel to converter 40 on the receive side of the device. If the received byte is intended directly connected cell delineation block 42, direct connection controller closes switch 64. If the incoming link is associated with an IMA group on another chip, the received byte Rx is passed through message assembler 84, which adds the address of the destination link, and passed through transmit FIFO 86 and ring driver 88 for transmission to the appropriate device over ring 30.

Bytes coming off the ring 30 are received in ring receiver 90 and passed to address comparator 92, wherein they are compared with addresses stored in ring address register 94. If an incoming message contains a byte intended for the device, it is output form the comparator 92 either as a transmit byte Tx or a receive byte Rx. If it is a transmit byte Tx, it is passed to the appropriate output port 22. If it is a receive byte Rx, it is passed to the appropriate cell delineation block 42 of the receive portion of the device.

The expansion port 33 is under overall control of ring controller 94, which automatically forwards messages not intended for the device to the transmit FIFO 86 for output to the ring 30. One IMA device is designated the master, and the ring master control 94 for this device has the additional function of discarding redundant messages that have travelled around the ring. Before forwarding the messages, the device of the master has the additional function of performing a check to see whether they should be discarded.

When two or more devices are cascaded together, they are first connected in a daisy chain arrangement through their expansion ports 33. One device must be configured as the ring master. This is done by writing to a control register. Each TX Cell Modifier Block 18 and RX Cell Delineation Block 50 available to form part of an IMA group is assigned a ring address ranging from 0 to 31. The same ring address is used for both the TX Cell Modifier Block 18 and the associate RX Cell Delineation Block 50, but the same address should not be used for more than one TX Cell Modifier 18/RX Cell Delineation block 50 pair.

Likewise, each TX port 22 and RX port 40 is also assigned a common ring address, but the same address should not be used for more than one TX/RX port 22, 40 pair.

When the outgoing packet is to be routed through the ring 30, then the paired TX and RX ports are assigned the same ring address. The connection is made by matching the ring address of the TX Cell Modifier Block 18 to the TX port 22, and matching the address of the RX port 40 to the RX Cell Delineation block 50.

There are 16 registers to assign a ring address to the or Cell Modifier/Cell delineation pair (18/42) and some additional bits in the control register.

The ring 30 can run at the system clock speed or at half of the frequency of the system clock. In the latter case, only 16 ports can be routed through the expansion port.

Although the TX and RX ports 22, 40 and the TX Cell Modifier 18 and RX Cell Delineation blocks 42 are paired, it is still possible to support the asymmetrical mode for an IMA group (where the number of TX and RX links can be different). In this case, the software does not enable either the TX port 22, or RX port 40.

It is possible to employ an enhanced switching mode where more than one fractional T1/E1 channel is merged internally into a selected port. This permits the multiplexing of multiple channels onto a single TDM link, which eliminates the use of an external switch.

Figure 3:
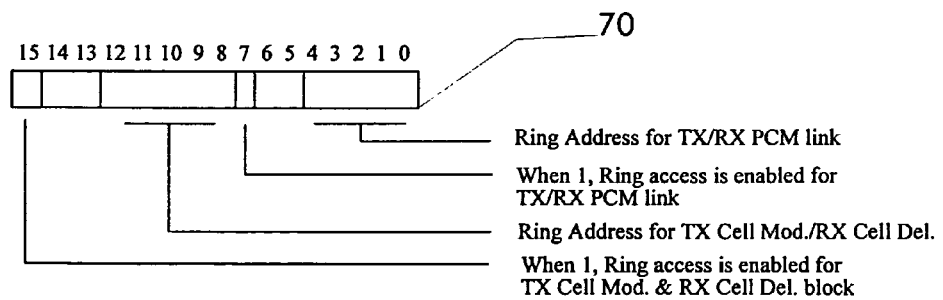
FIG. 3 shows the ring address register.

The ring address register 70, shown in FIG. 3, is a 16 bit register. Bits 12 to 8 of the register define the ring address of the TX Cell Modifier Block 18/RX block 50. Bits 4 to 0 define the TX/RX ring address. The bit 15 and 7 are enable bits which define if the ring connection is enabled for the TX/RX port or if the default internal direct connection is to be used. When bit 15 and bit 7 are 0, the normal connection between the cell modifier block and the Tx port 22, and between the Rx port 40 and cell delineation block 42 is established.

A ring connection can be made to another port that is on the same device but not directly connected to the cell modifier block 18. In this case the data is carried over the ring 30 to get to the destination port is on the same device.

The data packets are carried on the ring 30 in the form of two-byte messages as shown in Table 1 below. The first byte contains the address in the lower 5 bits (bit 0 to 4). The upper 2 bits are used to define the type of message, as defined in the table below.

The bit 5 is used as a maintenance bit, which is controlled ring master control 94 of the device which is defined to be the Ring Master. For each message entering the Master Ring device, if this bit is set to 1, the device replaces the message type by an empty message. Counting the number of occurrences Status Bits indicates a problem. When the bit is 0 in the message entering the Ring Master device, it is set to 1 and the rest of the message is not altered. If it goes through the ring without being addressed, it will get discarded when coming back to the Ring Master.

The second byte is a data byte forming part of a data packet, typically an ATM cell, to be transmitted over a link. In this case 53 messages are need to transfer a cell to a link connected to different device.

TABLE 1

| Message type | |
| --- | --- |
| Bit 7:6 | Message Type |
| 00 | Empty Message |
| 01 | Request a byte |
| 10 | Byte Received |
| 11 | Byte to Transmit |

In the UNI mode, that is without employing the inverse multiplexing option, a DS1 link, for example, can be terminated in any of the cascaded devices without passing through the ring 30.

In another application, a single 16-port IMA device would be able to support n×64 time slots for use with SHDSL and HDSL2 lines. Typically at a frame rate of 8 KHz, the number of timeslots can be programmed from 1 to 32 in steps of one timeslot, and then in multiples of 32 timeslots from 32 to 28 timeslots per frame.

It will thus be appreciated that the described device permits a number of physical links greater than the number of ports on any one physical device to be formed into an IMA group by cascading like devices together without the need for complex external circuitry. A the same time, the internal structure of the device is standard.

What is claimed is:

1. An inverse multiplexer device comprising:
an input port for receiving a stream of data packets;
a plurality of output ports for connection to outgoing physical links;
transmit buffers for preparing outgoing packets for transfer to said output ports;
a first expansion port connectable into a parallel ring and capable of receiving packets from said transmit buffers and transferring them through a corresponding second expansion port on an other like inverse multiplexer device to designated outgoing physical links on said other inverse multiplexer device; and
a controller for transferring the data packets in a round-robin fashion from said transmit buffers through said output ports or said first expansion pot to a group of outgoing physical links made up of links associated with both said inverse multiplexer device and said other inverse multiplexer device and forming an inverse multiplex group in accordance with an inverse multiplex protocol; and
wherein said first expansion port further comprises a master ring controller for permitting said inverse multiplexer device to act as a master and control overall operation of said parallel ring;
whereby said inverse multiplexer devices can be cascaded to increase the number of output links that can be accommodated by said inverse multiplex protocol.

2. An inverse multiplexer device as claimed in claim 1, wherein said first expansion port is connected between said transmit buffers and said output ports associated therewith.

3. An inverse multiplexer device as claimed in claim 2, further comprising connections normally connecting said output ports with their respective associated transmit buffers, and switches in said connections to divert packets on command through said first expansion port to output links on said other like inverse multiplexer device.

4. An inverse multiplexer device as claimed in claim 1, wherein said parallel ring carries control messages between said inverse multiplexer devices.

5. An inverse multiplexer device as claimed in claim 1, further comprising address registers for storing an address on said ring of the transmit buffers and output ports connected to said ring.

6. An inverse multiplexer device as claimed in claim 5 wherein said ring has a control port common to transmit and receive directions.

7. An inverse multiplexer device as claimed in claim 1, further comprising a plurality of additional input ports for receiving streams of packets from a plurality of incoming physical links, receive buffers for receiving incoming packets on said incoming physical links, an additional output port for outputting a single stream of packets received on said incoming physical links, and said first expansion port also being connected between said additional input ports and said receive buffers so as to permit packets arriving on a physical link connected to said other inverse multiplexer device to be diverted to one of said receive buffers.

8. An inverse multiplexer device as claimed in claim 1, wherein said first expansion port comprises a message assembler for assembling outgoing bytes into messages containing a destination address, and an address comparator for extracting incoming bytes destined for said inverse multiplexer device.

9. A method of inverse multiplexing stream of data packets comprising the steps of:
providing at least two like inverse multiplexer devices, each said inverse multiplexer device having an input port for receiving a stream of data packets, a plurality of output ports for connection to outgoing physical links, transmit buffers for preparing outgoing packets for transfer to said output ports, and a first expansion port capable of receiving packets from said transmit buffers and transferring them through a corresponding second expansion port on the other like inverse multiplexer device to designated output links on the other like inverse multiplexer device;
receiving a stream of data packets on the input port of one of said inverse multiplexer devices forming a master;
forming an inverse multiplex group comprising physical links associated with said inverse multiplexer device and at least one other said inverse multiplexer device; and
transmitting said received packets over said physical links forming the inverse multiplex group in a round-robin fashion in accordance with an inverse multiplexing protocol by passing said packets assigned to links on said other device through said expansion port; and
wherein said packets are passed to the other inverse multiplexer device over a parallel ring controlled from a common expansion port.

10. A method as claimed in claim 9, wherein said parallel ring carries control messages between said like inverse multiplexer devices.

11. A method as claimed in claim 10, wherein said control messages comprise a data byte and a control byte.

12. A method as claimed in claim 11, wherein said control byte includes a destination address for said data byte.

13. A method as claimed in claim 12, wherein said first expansion port strips incoming bytes from said control messages when the destination address matches an address on the inverse multiplexer device and passes the extracted bytes to an appropriate one of said output ports.

14. A method as claimed in claim 13, wherein said first expansion port controls a switch connecting the transmit buffers to associated output ports on the same inverse multiplexer device.

\* \* \* \* \*